United States Patent
Iwamura

(10) Patent No.: US 9,338,719 B2
(45) Date of Patent: May 10, 2016

(54) MOBILE STATION AND RADIO BASE STATION

(71) Applicant: NTT DOCOMO, INC., Tokyo (JP)

(72) Inventor: Mikio Iwamura, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 13/937,863

(22) Filed: Jul. 9, 2013

(65) Prior Publication Data

US 2013/0303169 A1 Nov. 14, 2013

Related U.S. Application Data

(62) Division of application No. 12/934,360, filed as application No. PCT/JP2009/055841 on Mar. 24, 2009, now Pat. No. 8,509,783.

(30) Foreign Application Priority Data

Mar. 25, 2008 (JP) ................. 2008-076900

(51) Int. Cl.
*H04W 36/30* (2009.01)
*H04W 24/10* (2009.01)
*H04L 29/06* (2006.01)
*H04W 4/06* (2009.01)
*H04W 8/26* (2009.01)
*H04W 12/08* (2009.01)
*H04W 36/00* (2009.01)
*H04W 36/08* (2009.01)
*H04W 84/04* (2009.01)

(52) U.S. Cl.
CPC .............. *H04W 36/30* (2013.01); *H04W 24/10* (2013.01); *H04L 63/101* (2013.01); *H04W 4/06* (2013.01); *H04W 8/26* (2013.01); *H04W 12/08* (2013.01); *H04W 36/0094* (2013.01); *H04W 36/08* (2013.01); *H04W 84/045* (2013.01)

(58) Field of Classification Search
CPC ........................... H04W 36/30; H04W 72/082
USPC ........... 455/436–439, 442, 452.1–2; 370/331, 370/332
See application file for complete search history.

(56) References Cited

U.S. PATENT DOCUMENTS

| | | | | |
|---|---|---|---|---|
| 6,198,928 | B1 * | 3/2001 | Keurulainen et al. | 455/436 |
| 7,565,145 | B2 * | 7/2009 | Gallagher et al. | 455/436 |
| 8,036,656 | B2 | 10/2011 | Jeong et al. | |

(Continued)

OTHER PUBLICATIONS

International Search Report w/translation from PCT/JP2009/055841 dated May 19, 2009 (4 pages).

(Continued)

Primary Examiner — Cong Tran
(74) Attorney, Agent, or Firm — Osha Liang LLP

(57) ABSTRACT

A mobile station LIE is provided with an access right management unit for managing a CSG-ID corresponding to a CSG cell which permits the mobile station UE to access thereto, a measurement unit for measuring the radio quality of a CSG cell defined as an object to be measured, and a measurement report transmission unit for, only when the radio quality of a CSG cell corresponding to the CSG-ID managed by the access right management unit out of the radio qualities of CSG cells measured by the measurement unit satisfies a report condition, transmitting a measurement report including at least the radio quality of the CSG cell corresponding to the CSG-ID.

1 Claim, 5 Drawing Sheets

(56) References Cited

U.S. PATENT DOCUMENTS

| | | | |
|---|---|---|---|
| 8,081,602 B2* | 12/2011 | Bernhard et al. | 370/331 |
| 8,301,146 B2 | 10/2012 | Iwamura et al. | |
| 8,331,942 B2* | 12/2012 | Usuda | H04W 36/18 455/442 |
| 8,948,758 B2* | 2/2015 | Dahlen | 455/436 |
| 2002/0137518 A1* | 9/2002 | Achour | H04W 16/06 455/447 |
| 2003/0060201 A1* | 3/2003 | Soliman | H04W 36/32 455/442 |
| 2005/0149443 A1 | 7/2005 | Torvinen | |
| 2005/0221824 A1* | 10/2005 | Lee et al. | 455/435.2 |
| 2005/0260992 A1* | 11/2005 | Moon | H04B 7/022 455/436 |
| 2008/0019320 A1* | 1/2008 | Phan et al. | 370/331 |
| 2008/0051093 A1 | 2/2008 | Ojala et al. | |
| 2009/0097436 A1 | 4/2009 | Vasudevan et al. | |
| 2010/0002650 A1* | 1/2010 | Ahluwalia | 370/331 |
| 2010/0260139 A1* | 10/2010 | Backstrom et al. | 370/331 |
| 2011/0117916 A1* | 5/2011 | Dahlen | H04W 48/08 455/436 |
| 2011/0268034 A1 | 11/2011 | Cho et al. | |
| 2012/0057474 A1 | 3/2012 | Hirano et al. | |
| 2012/0208556 A1 | 8/2012 | Jung et al. | |

OTHER PUBLICATIONS

Written Opinion from PCT/JP2009/055841 dated May 19, 2009 (4 pages).

3GPP TSG-RAN WG2#61, R2-081114; "Identification and Measurement of CSG cells"; Motorola; Sorrento, Italy; Feb. 11-15, 2008 (2 pages).

3GPP TSG RAN WG2 Meeting #59, R2-073374; "Cell ID Assignment for Home Node B"; NTT DOCOMO, INC.; Athens, Greece; Aug. 20-24, 2007 (5 pages).

3GPP TS 36.331 V8.1.0; "3rd Generation Partnership Project; Technical Specification Group Radio Access Network; Evolved Universal Terrestrial Radio Access (E-UTRA) Radio Resource Control (RRC); Protocol specification"; Mar. 2008 (122 pages).

3GPP TS 36.300 V8.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description"; Mar. 2008 (126 pages).

Office Action in counterpart Korean Patent Application No. 10-2010-7021905, with english translation, mailed Feb. 10, 2015 (5 pages).

T Mobile et al; "Discovery of and mobility to CSG cells"; 3GPP TSG RAN2#59bis, R2-073919, Shanghai, China, Oct. 8-12, 2007 (3 pages).

* cited by examiner

| Measurement ID | Measurement Object | Reporting Configuration |
| --- | --- | --- |
| #1 | E-UTRAN | R1 |
| #2 | UTRAN | R2 |
| #3 | GERAN | R3 |
| #4 | CSG | R4 |
| ⋮ | ⋮ | ⋮ |

FIG. 4

CSG-ID=#123

| GCI | PCI | RAT/FREQUENCY | CIO |
|---|---|---|---|
| 1 | X | XX/$f_1$ | - |
| 2 | Y | XX/$f_2$ | y dB |
| ⋮ | ⋮ | ⋮ | ⋮ |

FIG. 5

| ORDER | PCI | RSRP | ACCESS RIGHT |
|---|---|---|---|
| 1 | A | a dB | NO CSG ACCESS RIGHT |
| 2 | B | b dB | MACRO CELL |
| 3 | C | c dB | HAVING CSG ACCESS RIGHT |

MOBILE STATION AND RADIO BASE STATION

CROSS REFERENCE TO RELATED APPLICATIONS

The present application is a divisional application of U.S. patent application Ser. No. 12/934,360 filed Sep. 24, 2010, which is a National Stage application of PCT/JP2009/055841 filed Mar. 24, 2009, which claims priority to JP2008-076900 filed Mar. 25, 2008. The contents of the priority applications are hereby incorporated by reference in their entirety.

TECHNICAL FIELD

The present invention relates to a mobile station which is capable of performing a handover to an access restricted cell settable to accept access only from a particular mobile station. The present invention also relates to a radio base station which instructs a mobile station to perform a handover to an access restricted cell settable to accept access only from a particular mobile station.

BACKGROUND ART

There is known a mobile communication system in which CSG cells (access restricted cells) settable to accept access only from particular mobile stations (a particular user group, that is, CSG: Closed Subscriber Group) can be deployed in a home, an office and the like.

In such a mobile communication system, a mobile station is capable of performing a handover from an ordinary macro cell to a CSG cell. Hereinbelow, referring to FIG. 7, a description will be given of a handover procedure which is most likely to be adopted in 3GPP.

As shown in FIG. 7, in Step S1, a mobile station UE which is in an RRC_Connected mode in a macro cell controlled by a macro radio base station Macro-eNB sends the macro radio base station Macro-eNB "Measurement Gap Request" which requests the macro radio base station Macro-eNB to assign the mobile station UE a measurement gap (measurement interval) for measuring radio qualities of CSG cells which employ different frequencies from a frequency of the macro cell.

In Step S2, the macro radio base station Macro-eNB sends the mobile station UE "Measurement Configuration" including a result of the assignment of the above-mentioned measurement gap.

In Step S3, the mobile station UE measures radio qualities of CSG cells each corresponding to "PCI (Physical Cell ID)" managed in "CSG whitelist," in the measurement gap assigned thereto via "Measurement Configuration." The mobile station UE then sends the macro radio base station Macro-eNB "Measurement Report (PCI Reporting)" including the radio qualities of the CSG cells.

In this respect, a PCI is repeatedly used in the mobile communication system. As to CSG cells, in particular, it is assumed that there are multiple CSG cells employing a common PCI, in a coverage of a single macro cell.

As described above, there is a case where a single PCI is associated with multiple CSG cells. Thus, in the case where the PCI included in "Measurement Report (PCI Reporting)" thus received cannot uniquely specify a single CSG cell, the macro radio base station Macro-eNB sends in Step S4 the mobile station UE "GCI Report Request" which requests the mobile station UE to transmit "Measurement Report (GCI Reporting)" on a CSG cell specified by "GCI (Global Cell TD)."

In Step S5, in response to "GCI Report Request" thus received, the mobile station UE sends the macro radio base station Macro-eNB "Measurement Report (GCI Reporting)" on the CSG cell specified by the GCI. The Measurement Report includes at least a GCI or a CSG-ID.

Here, Steps S2 and S4 may be performed concurrently, and Steps S3 and S5 may be performed concurrently.

In Step S6, the macro radio base station Macro-eNB determines that the mobile station UE has to perform a handover from the macro cell controlled by the macro radio base station Macro-eNB itself to a CSG cell controlled by a home radio base station Home-eNB. The macro radio base station Macro-eNB thus sends the home radio base station Home-eNB "HO Preparation Request" requesting the home radio base station Home-eNB to prepare for the handover.

In Step 7, when having successfully reserved a resource for the handover, the home radio base station Home-eNB sends the macro radio base station Macro-eNB "HO Preparation ACK."

In Step 8, when having received "HO Preparation ACK," the macro radio base station Macro-eNB sends the mobile station UE "HO command" to instruct the mobile station UE to perform the handover.

In Step 9, after having completed processing related to the handover to the home radio base station Home-eNB, the mobile station UE sends the home radio base station Home-eNB "HO Complete."

The handover procedure described above, which is most likely to be adopted in 3GPP, however, has a problem of lack of a specific definition for how the macro radio base station Macro-eNB should cause the mobile station UE to measure a radio quality of a CSG cell, by use of "Measurement Configuration", and a specific definition for how the mobile station UE should report the measurement result of the radio quality of the CSG cell by use of "Measurement Report."

DISCLOSURE OF THE INVENTION

The present invention has been made to address the above problem, and an object of the present invention is to provide a mobile station and a radio base station which are capable of optimally implementing a handover from a macro cell to a CSG cell.

A first aspect of the present invention is summarized as a mobile station capable of performing a handover to an access restricted cell settable to accept access only from a particular mobile station, the mobile station comprise an access right manager unit configured to manage an access restricted group ID associated with an access restricted cell accepting access from the mobile station, a measurement unit configured to measure radio qualities of access restricted cells each specified as a measurement object and a Measurement Report transmitter unit configured to send a measurement report including a radio quality of the access restricted cell corresponding to the access restricted group ID managed by the access right manager unit, among the radio qualities of the access restricted cells measured by the measurement unit, only in a case where the radio quality of the corresponding access restricted cell fulfills a reporting condition.

In the first aspect, wherein the access right manager unit stores and manages a PCI (Physical Cell ID) and a frequency of the access restricted cell corresponding to the managed access restricted group ID.

In the first aspect, wherein the Measurement Report transmitter unit sends a measurement report including radio qualities of a predetermined number of cells which are selected in a descending order of fineness among from the measured radio qualities.

In the first aspect, wherein, in the measurement report, the Measurement Report transmitter unit indicates which one of the radio qualities of the cells is a radio quality of an access restricted cell.

In the first aspect, wherein, in the measurement report, the Measurement Report transmitter unit indicates which one of the radio qualities of the cells is a radio quality of an access restricted cell corresponding to the access restricted group ID managed by the access right manager unit.

In the first aspect, wherein the measurement unit measures the radio quality of the access restricted cell specified as the measurement object upon receipt of measurement method designation information indicating an instruction to measure the radio quality of the access restricted cell and the measurement method designation information does not include the access restricted group ID.

A second aspect of the present invention is summarized as a mobile station capable of performing a handover to an access restricted cell settable to accept access only from a particular mobile station, the mobile station comprise a Measurement Gap Request transmitter unit configured to send a measurement gap request to thereby securely acquire a measurement gap for measuring a radio quality of an access restricted cell which is specified as a measurement object, a measurement unit configured to measure the radio quality of the access restricted cell specified as the measurement object, in the measurement gap and a Measurement Report transmitter unit configured to send a measurement report including the radio quality of the access restricted cell measured by the measurement unit.

In the second aspect, wherein the Measurement Gap Request transmitter unit securely acquires the measurement gap which a radio base station designates in response to the measurement gap request.

In the second aspect, wherein the Measurement Gap Request transmitter unit suspends transmission of the measurement gap request for a predetermined time period in response to a notification from a radio base station.

A third aspect of the present invention is summarized as a radio base station which instructs a mobile station to perform a handover to an access restricted cell settable to accept access only from a particular mobile station wherein the radio base station is configured to send the mobile station a first measurement method designation information indicating an instruction to measure a radio quality of an access restricted cell or a second measurement method designation information indicating an instruction to measure a radio quality in a specific measurement object frequency, the first measurement method designation information does not include information on an individual cell corresponding to the access restricted cell and the second measurement method designation information includes at least the measurement object frequency.

BRIEF DESCRIPTION OF THE DRAWINGS

FIG. 4 is a diagram showing an example of CSG cells measured by a measurement unit of the mobile station according to the first embodiment of the present invention.

FIG. 5 is a diagram showing an example of Measurement Report sent by a Measurement Report transmitter of the mobile station according to the first embodiment of the present invention.

BEST MODE FOR CARRYING OUT THE INVENTION (Configuration of Mobile Communication System According to First Embodiment of the Present Invention)

A configuration of a mobile communication system according to a first embodiment of the present invention will be described with reference to FIG. 1 to FIG. 5. Note that, the description will be given in the present embodiment taking as an example a mobile communication system to which the LTE (Long Term Evolution) scheme is applied. However, the present invention is not limited to the example of this mobile communication system.

Figure 1:
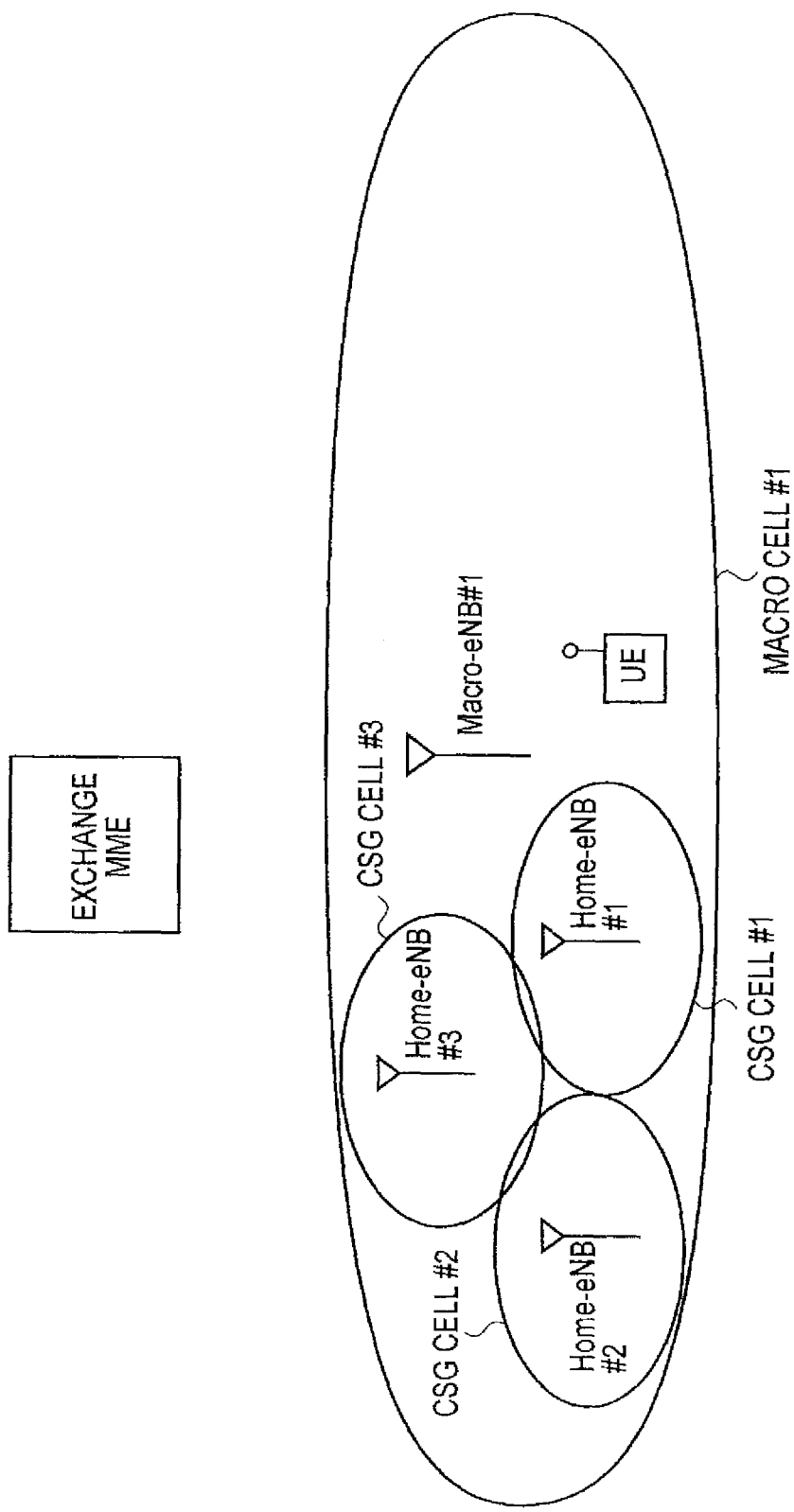
FIG. 1 is an overall configurational view of a mobile communication system according to a first embodiment of the present invention.

As shown in FIG. 1, the mobile communication system according to the present embodiment includes an upper node such as an exchange MME, a macro radio base station Macro-eNB #1, and multiple home radio base stations Home-eNB #1 to #3.

A macro cell #1 is managed by the macro radio base station Macro-eNB #1; a CSG cell #1 is managed by the home radio base station Home-eNB #1; a CSG cell #2 is managed by the home radio base station Home-eNB #2; and a CSG cell #3 is managed by the home radio base station Home-eNB #3.

Here, the CSG cells #1 to #3 are access restricted cells settable to accept access only from particular mobile stations.

Moreover, the multiple home radio base stations Home-eNB #1 to #3 are each configured to make a notification of a CSG-ID (or may be called a TA-ID: Tracking Area-ID) in a corresponding one of the CSG cells #1 to #3. In this respect, the multiple home radio base stations Home-eNB #1 to #3 may be configured to make notifications of a common CSG-ID for multiple CSG cells.

Note that the mobile station UE is capable of performing communication, i.e., capable of entering into an RRC_Connected mode, in a macro cell as well as in a CSG cell accepting access from the mobile station US.

Figures 2, 3:
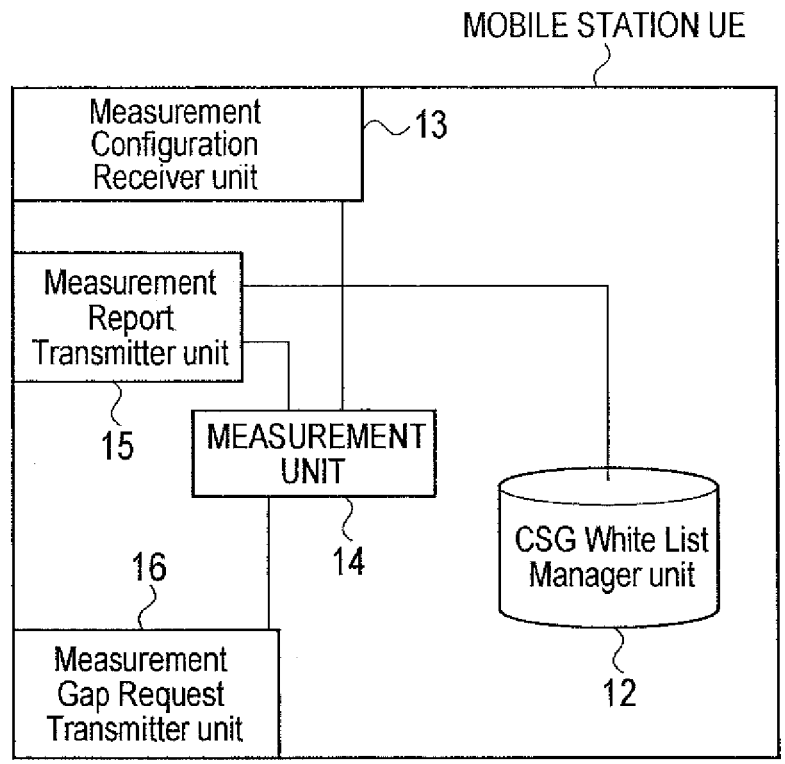
FIG. 2 is a functional block diagram of a mobile station according to the first embodiment of the present invention.
FIG. 3 is a diagram showing an example of "Measurement Configuration" which is received and managed by a Measurement Configuration receiver of the mobile station according to the first embodiment of the present invention.

As shown in FIG. 2, the mobile station US according to the present embodiment includes a CSG whitelist manager 12, a Measurement Configuration receiver 13, a measurement unit 14, a Measurement Report transmitter 15, and a Measurement Gap Request transmitter 16.

The CSG whitelist manager 12 is configured to manage CSG-IDs (access restricted group IDs) associated with CSG cells (access restricted cells) accepting access only from the mobile station UE.

For example, the CSG whitelist manager 12 may be provided in a USIM (User Subscriber Identity Module).

Specifically, the CSG whitelist manager 12 is configured to store and manage a list of the CSG-IDs associated with the CSG cells accepting access only from the mobile station US, as a "CSG whitelist."

The Measurement Configuration receiver 13 is configured to receive "Measurement Configuration" which is sent from the macro radio base station Macro-eNB and which is a type of an RRC (Radio Resource Control) message.

As shown in FIG. 3, "Measurement Configuration" includes "Measurement ID," "Measurement Object," and "Reporting Configuration."

"Measurement Object" is information to specify a measurement object.

For example, "E-UTRAN," "UTRAN," "GERAN," or "CSG" may be specified in "Measurement Object." "E-UTRAN" indicates a particular frequency used in a mobile communication system of the E-UTRAN (Evolved Universal Terrestrial Access Network) scheme. "UTRAN" indicates a particular frequency used in a mobile communication system of the UTRAN (Universal Terrestrial Access Network) scheme. "GERAN" indicates a particular frequency group (frequency band) used in a mobile communication system of the GERAN (GSM Edge Radio Access Network) scheme. "CSG" indicates a CSG cell.

In other words, "Measurement Configuration" in which "E-UTRAN," "UTRAN," or "GERAN," is set in "Measurement Object" is second measurement method designation information which indicates an instruction to measure a radio quality in a frequency of a measurement object.

To be more specific, information such as a measurement object frequency (frequency band), information on a neighbour cell located in the measurement object frequency, or "Black listed cells" can be set for "E-UTRAN," "UTRAN," or "GERAN."

The information on the neighbour cell may be called an NCL (Neighbour Cell List). Additionally, the NCL may include a PCI (a scrambling code used in the macro cell), an individual offset for each cell, or the like.

In addition, "Measurement Configuration" in which "CSG" is set in "Measurement Object" is first measurement method designation information which indicates an instruction to measure a radio quality of an access restricted cell.

To be more specific, a certain offset value may be optionally set for "CSG", the offset value being applicable uniformly to all the CSG cells corresponding to the CSG-IDs included in "CSG whitelist" held by the mobile station. The offset value is taken into consideration when the mobile station checks conditions to launch "Measurement Report."

In other words, information such as a CSG-ID associated with a CSG cell, a frequency (frequency band) used in the CSG cell, an NCL (Neighbour Cell List) of the CSG cell, a PCI of the CSG cell (scrambling code used by the CSG cell), or a GCI of the CSG cell is not set for "CSG". They are stored and managed by an access right manager in the mobile station as information elements in "CSG whitelist."

"Reporting Configuration" is information which specifies launching conditions of and a transmission method of "Measurement Report."

For example, the following methods (Event Trigger and Periodical) can be set for "Reporting Configuration." Specifically, one method (Event Trigger) is for sending "Measurement Report" in response to a certain transmission trigger (Events A1 to A5, for example) while another method (Periodical) is for sending "Measurement Report" periodically.

In addition, reporting condition (reporting criteria) for "Measurement Report" or parameters employed in the reporting condition can be set for "Reporting Configuration."

"Measurement ID" is provided to link "Measurement Object" with "Reporting Configuration." Only in a case where "Measurement ID" is set, the mobile station sends "Measurement Report" to the base station. When "Measurement Report" includes the corresponding one of "Measurement ID," the base station can easily determine for which set of "Measurement Object" and "Reporting Configuration" "Measurement Report" thus received corresponds.

The measurement unit 14 is configured such that when the Measurement Configuration receiver 13 receives "Measurement Configuration" in which "CSG" is set in "Measurement Object", the measurement unit 14 measures the radio quality of a CSG cell (access restricted cell) which is specified as a measurement object.

Specifically, the measurement unit 14 may be configured to determine a CSG cell specified as a measurement object, by use of "fingerprint" or GPS information.

"Fingerprint" is designed to maintain the surrounding environment (information such as a PCI or a radio quality of a neighbor macro cell, for example) of a CSG cell to which the mobile station has a right of access. The use of "fingerprint" allows limiting the measurement range of the CSG cell, thereby making it possible to keep the battery consumption less in the CSG cell measurement.

For example, as shown in FIG. 4, the measurement unit 14 may be configured to manage a combination of "GCI," "PCI," and "RAT/frequency" in a CSG cell, for each CSG-ID as a measurement object.

In addition, the measurement unit 14 may be configured to determine a CSG cell being a measurement object on the basis of the notified CSG-ID.

Here, the measurement unit 14 may be configured to measure the radio quality of a macro cell which uses the same frequency as does the CSG cell of the measurement object.

Moreover, the measurement unit 14 is configured to measure the radio quality of a CSG cell in a measurement gap (measurement interval) which is securely acquired by the Measurement Gap Request transmitter 16 in a case where the frequency used in the CSG cell is different from the frequency used in a serving cell which the mobile station UE is currently in.

The Measurement Report transmitter 15 is configured to send the macro radio base station Macro-eNB "Measurement Report" including the radio quality of the access restricted cell measured by the measurement unit.

Note that the Measurement Report transmitter 15 is configured as follows. Specifically, only in a case where, among the radio qualities of CSG cells measured by the measurement unit 14, the radio quality of a CSG cell which is determined or presumed to correspond to a CSG-ID (access restricted group ID) managed by the CSG whitelist manager 12 (access right manager) fulfills reporting conditions (Reporting Criteria), the Measurement Report transmitter 15 sends "Measurement Report" including the radio quality of the relevant CSG cell.

Here, on the basis of whether or not a notified CSG-ID is included in "CSG whitelist" managed by the CSG whitelist manager 12, the Measurement Report transmitter 15 can determine whether or not the mobile station UE is allowed to access a CSG cell corresponding to the notified CSG-ID.

In addition, on the basis of whether or not a PCI of the measured cell is a PCI corresponding to a CSG-ID included in "CSG whitelist" managed by the CSG whitelist manager 12, the Measurement Report transmitter 15 can presume whether or not the mobile station UE is allowed to access a CSG cell corresponding to the CSG-ID.

Furthermore, the Measurement Report transmitter 15 may be configured to send "Measurement Report" including the radio qualities of a predetermined number of cells which are selected among from the measured radio qualities in a descending order of the fineness of the radio qualities.

For example, as shown in FIG. 5, the Measurement Report transmitter 15 may be configured to send "Measurement Report" including the radio qualities (RSRP=a (dB), b (dB), and c (dB)) of three CSG cells (PCI=A, B, and C) which are selected among from the measured radio qualities in a descending order of the fineness of the radio qualities.

Moreover, as shown in FIG. 5, the Measurement Report transmitter 15 is configured to indicate in "Measurement Report" which CSG cell is the CSG cell corresponding to the CSG-ID managed by the CSG whitelist manager 12, i.e., which CSG cell is the CSG cell accepting access from the mobile station UE.

The Measurement Gap Request transmitter 16 is configured to send "Measurement Gap Request" to thereby securely acquire a measurement gap (measurement interval) for measuring the radio quality of the CSG cell specified as the measurement object.

In addition, the Measurement Gap Request transmitter 16 may be configured to securely acquire a measurement gap (measurement interval) which the radio base station eNB designates in response to "Measurement Gap Request."

Note that the Measurement Gap Request transmitter 16 is configured to suspend transmission of "Measurement Gap Request" for a predetermined time period in response to a notification from the macro radio base station Macro-eNB.

In this respect, when having received "Measurement Gap Request" from a certain mobile UE, the macro radio base station Macro-eNB notifies the certain mobile station UE to suspend transmission of "Measurement Gap Request" for a predetermined time period. This measure is taken in order to prevent the certain mobile station UE from issuing too much "Measurement Gap Requests."

(Operations of Mobile Communication System According to First Embodiment of the Present Invention)

Operations of the mobile station UE according to the first embodiment of the present invention will be described with reference to FIG. 6.

Figure 6:
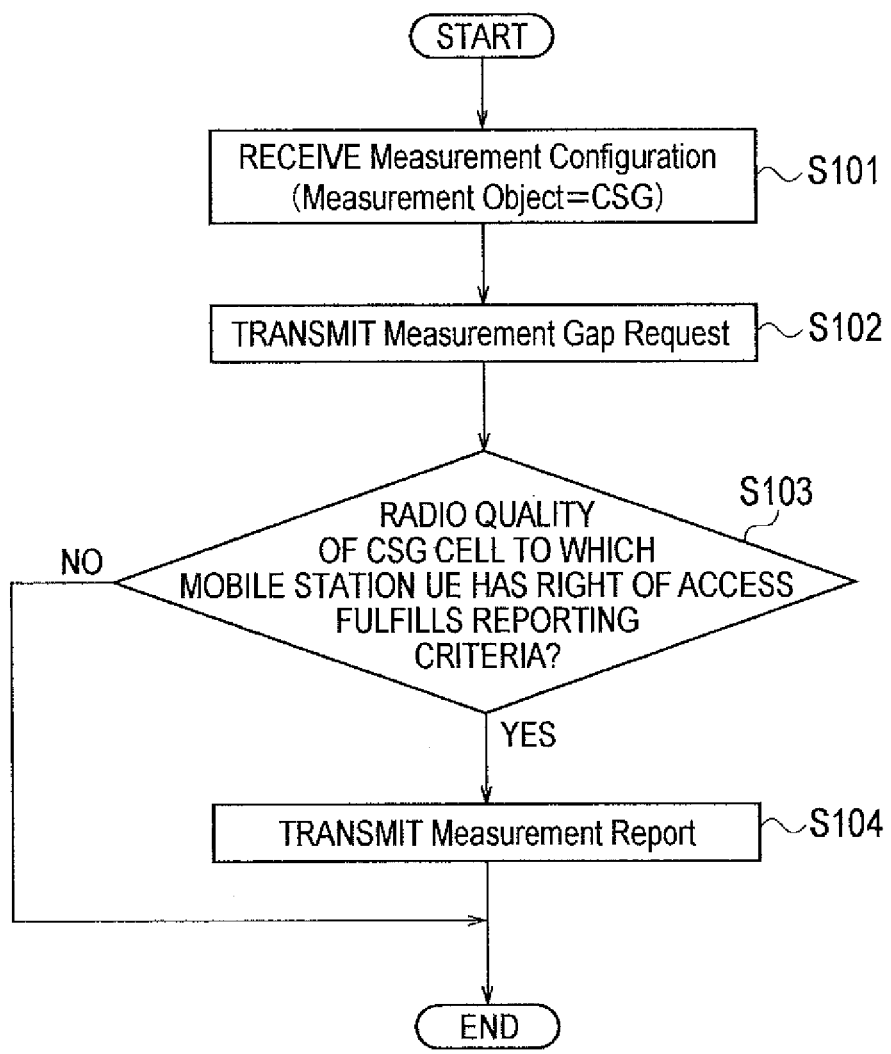
FIG. 6 is a flowchart showing operations of the mobile communication system according to the first embodiment of the present invention.
Figure 7:
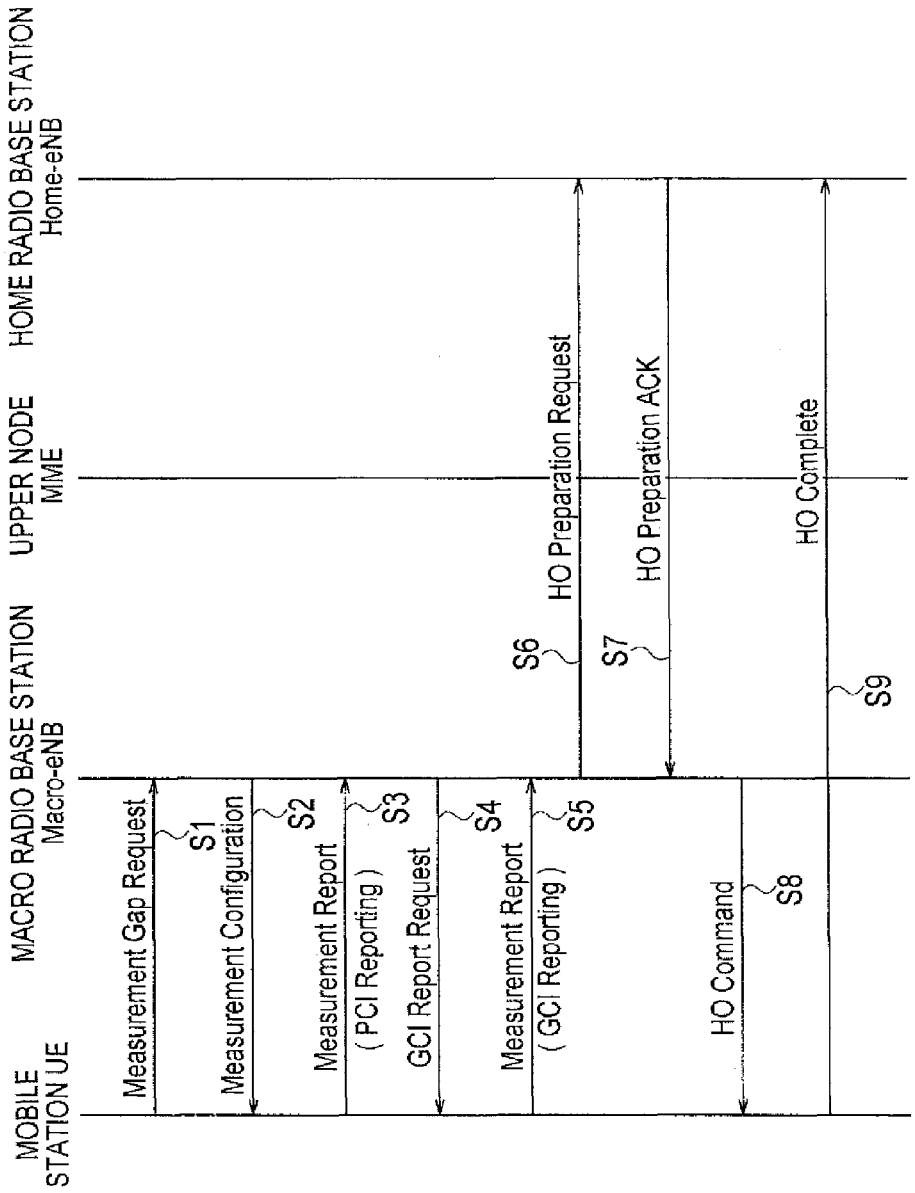
FIG. 7 is a sequence chart showing operations in an ordinary mobile communication system in which a handover is performed from a macro cell controlled by a macro radio base station to a CSG cell controlled by a home radio base station.

As shown in FIG. 6, in Step S101, a mobile station UE which is in an RRC_Connected mode in a macro cell #1 receives "Measurement Configuration" which is sent from the macro radio base station Macro-eNB and in which "CSG" is set in "Measurement Object."

In Step S102, the mobile station UE sends the macro radio base station Macro-eNB "Measurement Gap Request" requesting a measurement gap for measuring the radio qualities of CSG cells #1 to #3 which are specified as measurement objects and which use frequencies different from the frequency used by the macro cell #1.

Step S102 described above may be triggered by determining, on the basis of "fingerprint" or GPS information, that the mobile station UE is located in the vicinity of the CSG cell.

In this regard, the mobile station UE does not send "Measurement Gap Request" described above, in a case where a predetermined time period has not passed since the mobile station US is notified by the macro radio base station Macro-eNB to suspend the transmission of "Measurement Gap Request".

In Step S103, the mobile station UE determines whether or not the radio quality of a CSG cell to which the mobile station UE is presumed to have a right of access (CSG cell corresponding to the CSG-TD managed by the CSG whitelist manager 12, for example, one which is presumed from a PCI as a CSG cell corresponding to the CSG-ID) among the measured radio qualities of the cells fulfills reporting conditions.

In Step S104, when the mobile station UE determines that the radio quality of the CSG cell to which the mobile station UE is presumed to have aright of access fulfills the reporting conditions, the mobile station US sends the macro radio base station Macro-eNB "Measurement Report" which at least includes the relevant radio quality.

(Advantageous Effect of Mobile Communication System According to First Embodiment of the Present Invention)

In the mobile communication system according to the first embodiment of the present invention, the macro radio base station Macro-eNB does not have to include information such as a CSG-ID or measurement object frequency of a CSG cell for "CSG" set in "Measurement Object" in "Measurement Configuration", on the assumption that each mobile station UE stores and manages a measurement object of the CSG cell. Therefore, the mobile communication system according to the first embodiment of the present invention allows reduction in the message size of "Measurement Configuration."

In the mobile communication system according to the first embodiment of the present invention, the mobile station UE is configured to send "Measurement Report" only in a case where the radio quality of a CSG cell to which the mobile station UE is presumed to have a right of access (CSG cell corresponding to the CSG-ID managed by the CSG whitelist manager 12, for example, one which is presumed from a PCI as a CSG cell corresponding to the CSG-ID) among the measured radio qualities of the CSG cells fulfills reporting conditions. For this reason, even in a case where the radio quality of a CSG cell to which the mobile station UE does not have a right of access fulfills reporting conditions of "Measurement Report," the mobile communication system according to the first embodiment of the present invention can prevent wasteful transmission of "Measurement Report."

(Modified Embodiment)

Note that operation of the above described mobile station. UE, of the macro radio base station Macro-eNB, of the home radio base station Home-eNB, and of the upper node MME may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided described the mobile station UE, the macro radio base station Macro-eNB, the home radio base station Home-eNB or the upper node MME. Also, the storage medium and the processor may be provided in the mobile station UE, the macro radio base station Macro-eNB, the home radio base station Home-eNB or the upper node MME as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

INDUSTRIAL APPLICABILITY

As described above, an object of the present invention is to provide a mobile station and a radio base station which are capable of optimally implementing a handover from a macro cell to a CSG cell.

The invention claimed is:

1. A radio base station which instructs a mobile station to perform a handover to an access restricted cell settable to accept access only from a particular mobile station, wherein
 the radio base station is configured to send the mobile station a first measurement method designation information indicating an instruction to measure a radio quality of an access restricted cell,
 the first measurement method designation information does not include information on an individual cell corresponding to the access restricted cell, wherein
 the radio base station is configured to send the mobile station a second measurement method designation information indicating an instruction to measure a radio quality in a specific measurement object frequency, and
 the second measurement method designation information includes at least the measurement object frequency.

* * * * *